US012040538B2

(12) United States Patent
Martin Bartrina et al.

(10) Patent No.: US 12,040,538 B2
(45) Date of Patent: Jul. 16, 2024

(54) ANTENNA ARRAY MODULE

(71) Applicant: MARITIME IOT SOLUTIONS BV, Antwerp (BE)

(72) Inventors: Alvaro Martin Bartrina, Madrid (ES); Jose Luis Vazquez Roy, Leganes (ES); Luis Fernando De Inclan Sanchez, Leganes (ES); Eva Rajo Iglesias, Leganes (ES)

(73) Assignee: MARITIME IOT SOLUTIONS BV, Antwerp (BE)

( * ) Notice: Subject to any disclaimer, the term of this patent is extended or adjusted under 35 U.S.C. 154(b) by 141 days.

(21) Appl. No.: 17/912,679

(22) PCT Filed: Mar. 18, 2021

(86) PCT No.: PCT/EP2021/056950
§ 371 (c)(1),
(2) Date: Sep. 19, 2022

(87) PCT Pub. No.: WO2021/185970
PCT Pub. Date: Sep. 23, 2021

(65) Prior Publication Data

US 2023/0178882 A1 Jun. 8, 2023

(30) Foreign Application Priority Data

Mar. 19, 2020 (EP) .................................... 20382203

(51) Int. Cl.
*H01Q 1/34* (2006.01)
*H01Q 1/22* (2006.01)
(Continued)

(52) U.S. Cl.
CPC ............ *H01Q 1/34* (2013.01); *H01Q 1/2216* (2013.01); *H01Q 9/0428* (2013.01);
(Continued)

(58) Field of Classification Search
CPC ...... H01Q 1/34; H01Q 1/2208; H01Q 1/2216; H01Q 1/2225; H01Q 3/01; H01Q 3/02;
(Continued)

(56) References Cited

U.S. PATENT DOCUMENTS 10,025,960 B1 7/2018 Fink et al.
2004/0246104 A1 12/2004 Baechtiger et al.
(Continued)

FOREIGN PATENT DOCUMENTS

WO 2014086452 A1 6/2014

OTHER PUBLICATIONS

Indian Office Action from Corresponding Indian Patent Application No. IN202227058982, Aug. 3, 2023.
(Continued)

*Primary Examiner* — Robert Karacsony
(74) *Attorney, Agent, or Firm* — Workman Nydegger

(57) ABSTRACT

An antenna array module for a communication system on a cargo ship, includes at least a first, a second and a third antenna element, each mounted on a ground plane and containing an antenna feed. The first antenna element is tilted with respect to the second antenna element. The first and the second antenna element are arranged to radiate mainly towards a first path along the cargo ship and the third antenna element is arranged to radiate mainly towards a second path opposite to the first path.

14 Claims, 8 Drawing Sheets

(51) Int. Cl.

| | |
|---|---|
| ***H01Q 9/04*** | (2006.01) |
| ***H01Q 21/20*** | (2006.01) |
| ***H01Q 25/00*** | (2006.01) |

(52) U.S. Cl.
CPC ........... *H01Q 9/0457* (2013.01); *H01Q 21/20* (2013.01); *H01Q 25/005* (2013.01)

(58) Field of Classification Search
CPC .. H01Q 3/04; H01Q 3/06; H01Q 3/08; H01Q 3/12; H01Q 9/0428; H01Q 9/0457; H01Q 21/20; H01Q 21/29; H01Q 21/293; H01Q 21/296; H01Q 25/005
See application file for complete search history.

(56) References Cited

U.S. PATENT DOCUMENTS

| | | | |
|---|---|---|---|
| 2005/0159187 | A1 | 7/2005 | Mendolia et al. |
| 2005/0248454 | A1 | 11/2005 | Hanson et al. |
| 2007/0188386 | A1 | 8/2007 | Cheng |
| 2008/0211630 | A1 | 9/2008 | Butler et al. |
| 2008/0231459 | A1 | 9/2008 | Corder |
| 2009/0016308 | A1 | 1/2009 | Twitchell, Jr. |
| 2013/0229262 | A1 | 9/2013 | Bellows |

OTHER PUBLICATIONS

Indian Examination Report from Corresponding Indian Patent Application No. IN202227058982, Aug. 3, 2023.
Search Report from corresponding European Application No. 20382203.6, Oct. 2, 2020.
International Search Report from PCT Application No. PCT/EP2021/056950, Jun. 10, 2021.

ANTENNA ARRAY MODULE

FIELD OF THE INVENTION

The present invention is generally related to the field of antenna systems for use in a system for monitoring goods.

BACKGROUND OF THE INVENTION

Nowadays a huge majority of the non-bulk cargo worldwide is transported by container ships, i.e. cargo ships that carry all of their load in containers of standardized dimensions. They can be loaded and unloaded, stacked, transported efficiently over long distances, and transferred from one mode of transport to another (e.g. not only container ships but also via rail or with trucks etc) without being opened.

Container ships exist in various sizes, the largest one measuring about 400 m in length and having a capacity of far over 10000 TEU (twenty-foot equivalent units). Typical loads are a mix of 20-foot and 40-foot ISO-standard containers, with the latter being predominant, A container ship typically comprises one or more below-deck cargo holds. Cargo holds for dedicated container ships are specially constructed to speed loading and unloading, and to efficiently keep containers secure while at sea. In the cargo holds cell guides are installed, i.e. strong vertical metal structures, which guide containers into well-defined rows during the loading process and provide some support for containers against the ship's rolling at sea. The cargo holds are topped by hatch covers, onto which more containers can be stacked.

Systems have been developed for monitoring the cargo being transported without any need for manual procedures. Such prior art systems use simple antennas as base stations for the communication system. For example, US2004/246104 A1 describes a solution wherein each container is provided with a transponder which is mounted e.g. on a corrugated outer wall of the container by means of a supporting element like a plastic compound or a fabric pocket. The transponders comprise the following building blocks interconnected via a communication bus system:

- a fast receiving module and another transmitting/receiving module with corresponding antennas
- a processor module and memory module
- an interface module for connecting sensors
- a power supply with battery The communication with the transponder can be so arranged that the fast receiving module wakes the transponder up from its sleeping mode with an appropriate signal. The transponder comprises a second transmitting/receiving module operable at a frequency e.g. in the 868 MHz range.

The transponders allow performing bidirectional communication with the communication unit positioned at the deck of the ship. Experiences in the field however indicate that it often is cumbersome to obtain in a set-up as described above an acceptable level of link quality for the communication between the communication unit and the transponders, especially then if the transponders are located deep down in the cargo holds.

Patent application US2008/231459 A1 relates to a cargo container monitoring system. The system includes components located on a cargo ship for collecting cargo container status information for a plurality of cargo containers. The components include at least one combination data logger and gateway device. The combination device includes a first antenna and a second antenna. A first antenna is comprised in a data logger device or may be mounted on the protective housing of the data logger device. That first antenna receives and/or transmits wireless communication signals from and/or to the tags provided on the containers. No further details are provided on the first antenna. The second antenna is arranged for communication with satellites.

US2009/016308 A1 discloses an antenna in a cargo container monitoring system. The antenna system includes, associated with each container, a short range wireless communications transceiver device and at least one long range communications device communications device, a GPS element, and an antenna system integrated into the construction of each container wall, door, or roof. The antenna system comprises an antenna adapted for Bluetooth or WiFi communications and an antenna for satellite communication.

In US2007/188386 a solid flat antenna is presented including a reflecting unit, a first radiating unit, a second radiating unit and in some configurations a third radiating unit (to form a triangular pillar) and a fourth radiating unit (to form a square pillar).

Patents and patent applications like U.S. Pat. No. 10,025,960 B1, US2013/229262 A1 and US2008/211630 A1 disclose antenna structures with a number of antennas in a circular array arrangement.

WO2014/086452 relates to a dual-polarized, omnidirectional antenna wherein a number of antenna elements are stacked to form an antenna column. The antenna element are arranged offset with respect to one another along the central axis of said sector antennas, whereby the sector antennas cover different sectors in an azimuthal plane.

In US2005/248454 a marine asset security and tracking system is presented. It discloses multiple RFID tag readers on board a cargo ship with containers.

Given the ever increasing size of contemporary container ships, there is a need for an antenna array module that ensures a good link quality for the communication between deck and the transponders placed at a fixed position in or on the ship or connected to the containers.

SUMMARY OF THE INVENTION

It is an object of embodiments of the present invention to provide for an antenna array module for communication on board a cargo vessel between a communication unit and transponders provided in or on the vessel and/or provided on items being transported by the vessel.

The above objective is accomplished by the solution according to the present invention.

In a first aspect the invention relates to an antenna array module for a communication system on a cargo ship. The module comprises at least a first, a second and a third antenna element, each containing an antenna feed. The first and the second antenna element are arranged to radiate mainly towards a first path and the third antenna element is arranged to radiate mainly towards a second path opposite to the first path. The first antenna element is tilted with respect to the second antenna element.

The proposed solution indeed allows establishing a communication link of acceptable quality. The two antenna elements tilted with respect to one another mainly radiate in a direction determined by the directivity pattern of these antenna elements. Applying a certain tilting angle between the first and second antenna element allows achieving a resulting radiation pattern that can cover a path including the deepest and/or most remote parts of the cargo hold where goods are stored. A third antenna element is so positioned that it mainly radiates towards the opposite side, hence in a substantially opposite direction. The proposed antenna array module thus basically acts like a sector antenna array, whereby the first and second antenna element on the one hand and the third antenna element each mainly radiate towards a different sector.

In preferred embodiments at least one of the antenna elements is a patch antenna. This offers the advantage of its smaller size compared to other antenna types. Patch antennas are further easy to implement and at a low cost. They are also capable of supporting multiple frequency bands.

The first antenna element is tilted with respect to the second antenna element over an angle that allows also reaching containers deep in the cargo hold and/or positioned in the extremities of the vessel. Preferably the first and the second antenna element are tilted with respect to one another over an angle in the range of 3° to 80°, or in the range of 5° to 70°, or in the range of 10° to 60° or about 45°.

In embodiments of the invention at least one of the antenna elements is arranged for radiating with circular polarization. Using circular polarization may be advantageous due to its properties in terms of e.g. reflectivity and absorption. Also when a line-of-sight path is impaired, circular polarization may be more effective than e.g. linear polarization. In one embodiment the at least one antenna element is provided with perturbations to excite two orthogonal radiation modes for applying circular polarization.

In embodiments of the invention the antenna elements are arranged on a substrate of dielectric material. In a preferred embodiment air is employed as dielectric.

In advantageous embodiments the antenna array module comprising three antenna elements, i.e. two antennas tilted over a certain angle with respect to one another and arranged to radiate mainly towards a first path, and a third antenna arranged to radiate mainly in a second direction opposite to said first path.

In one embodiment the antenna array module comprises a power divider/combiner arranged to split a signal to be transmitted over the at least three antenna elements and to combine signals received from the at least three antenna elements.

Preferably the first antenna element is, when installed, tilted with respect to a vertical plane wherein the second antenna element is positioned, so that the directivity in vertical direction is improved. In preferred embodiments the antenna array module forms when installed a stack of antenna elements. Apart from the tilted antenna element the stack is substantially vertical.

In a preferred embodiment the antenna elements are made in a printed technology, as this allows for antenna elements of small size.

In another embodiment the antenna array module comprises a housing for the antenna elements. This embodiment is preferred because the antenna array module is intended for use in harsh conditions, e.g. at open sea.

In one embodiment the third antenna element is not tilted with respect to the second antenna element.

In another aspect the invention relates to a method for installing an antenna array module on a cargo ship. The method comprises:

taking an antenna array module as previously described, mounting the antenna array module on a platform on the bridge of the cargo ship, said bridge being so positioned to divide the cargo ship along its length axis in a longer part and a shorter part, whereby the first antenna element is tilted with respect to the second antenna element and the first and the second antenna element are so positioned that the main lobe of their directive pattern points towards a first path corresponding to the longer part, and the third antenna element is positioned to radiate mainly towards a second path opposite to the first path.

Stated otherwise, in this aspect the invention relates to a method for installing an antenna array module on a cargo ship, wherein the method comprises:

- taking an antenna array module for a communication system on the cargo ship, said antenna array module comprising at least a first, a second and a third antenna element, each containing an antenna feed,
- mounting the antenna array module on the bridge of said cargo ship, said bridge being so positioned to divide the cargo ship along its length axis in a longer part and a shorter part, whereby the first antenna element is tilted with respect to the second antenna element and the first and the second antenna element are so positioned that the main lobe of their directive pattern points towards a first path corresponding to the longer part, and the third antenna element is positioned to radiate mainly towards a second path opposite to the first path.

Advantageously a plurality of the antenna array modules are mounted on the bridge.

In preferred embodiments the antenna array module is mounted on a side of the bridge where a direct line of sight towards the longer part is available.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

FIG. 5, including

FIG. 8, including

DETAILED DESCRIPTION OF ILLUSTRATIVE EMBODIMENTS

Figure 1:
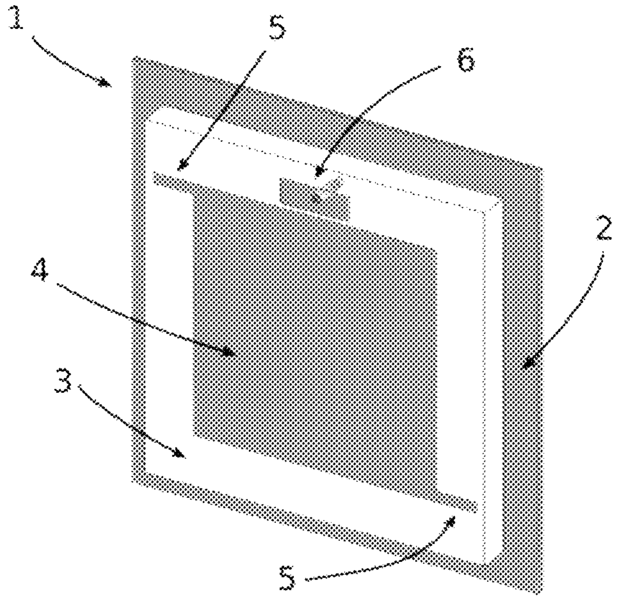
FIG. 1 illustrates in perspective view an embodiment of an antenna element of the antenna array module according to the invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention proposes in a first aspect an antenna array module arranged to establish communication between sensors installed on a cargo ship, e.g. on containers located on top of the deck or in the cargo hold below the deck of a container ship, and a communication unit typically located at the bridge of the ship.

Modern cargo vessels typically have a length that may amount to 300 à 400 metres and more and a width of e.g. 50 to 60 metres. The cargo hold may be as deep as 25 metres or more below the deck. The antenna array module according to the present invention is so designed that its antenna elements can deal with these huge dimensions to provide overall good coverage. The antenna elements are designed to confine the radiation in a vertical plane and to cover the full width of the ship.

The proposed antenna array module comprises three or more antenna elements. An embodiment of a single antenna element is shown in FIG. 1. The antenna element in FIG. 1 is implemented as a microstrip patch antenna. In other embodiments the antenna element can for example be a monopole, a dipole, a slot or another elementary antenna type well known to the skilled person. In certain embodiments one or more antenna elements of the module may be realized itself as a small subarray of antennas, for example an array of 2×2 slots.

More in particular FIG. 1 illustrates an embodiment of a microstrip patch antenna (i.e. an antenna fabricated with microstrip technology) with circular polarization. Microstrip patch antennas are as such well known in the art since many years. Microstrip patch antennas have become very popular for application in wireless communication systems, as they offer attractive benefits like low profile, light weight, compactness, easy fabrication etcetera.

The microstrip patch antenna (1) as in FIG. 1 comprises a ground plane (2), a metallization (4) (i.e. a metal layer), hereafter referred to as the patch, on top of a substrate of dielectric material (3). The patch in FIG. 1 has a substantially rectangular shape. In other embodiments the patch may have a different shape, e.g. circular or annular. The dielectric material may be directly air or any commercially available substrate, e.g. Teflon, PVC, polypropylene, FR4, etc. In an advantageous embodiment the dielectric material is air.

As commonly known, the polarization describes the orientation of the electric field intensity vector of an electromagnetic wave. In the embodiment of the antenna element of FIG. 1, the substantially rectangular patch is provided with some perturbations (5), which allow for circular polarization. In other embodiments other ways to obtain circular polarization can be used, for instance by using two ports per antenna and a 90° hybrid to feed them. Circular polarization is a specific case of elliptical polarization (i.e. whereby the tip of the electrical field vector describes an ellipse in any fixed plane intersecting and normal to the propagation direction). Hence, in other embodiments the antenna element can be arranged for the use of elliptical polarization. An elliptically polarized wave may be resolved into two linearly polarized waves in phase quadrature, with their polarization planes at perpendicular angles to each other. In yet other embodiments the antenna element is configured for linear polarization, for example vertically or horizontally or rotated over 45°.

The antenna element (1) is fed by a capacitive coupling implemented by a small metal portion (6), also named patch feed, on the same layer as the patch. A coaxial connector may be provided to feed the patch antenna that is connected to the ground plane (2) and to the small metallization (6). In other embodiments the patch antenna can be fed directly by the coaxial connector, by a microstrip transmission line or via an aperture in the ground plane. An embodiment with a feeding element on top of substrate can also be envisaged.

Figure 2:
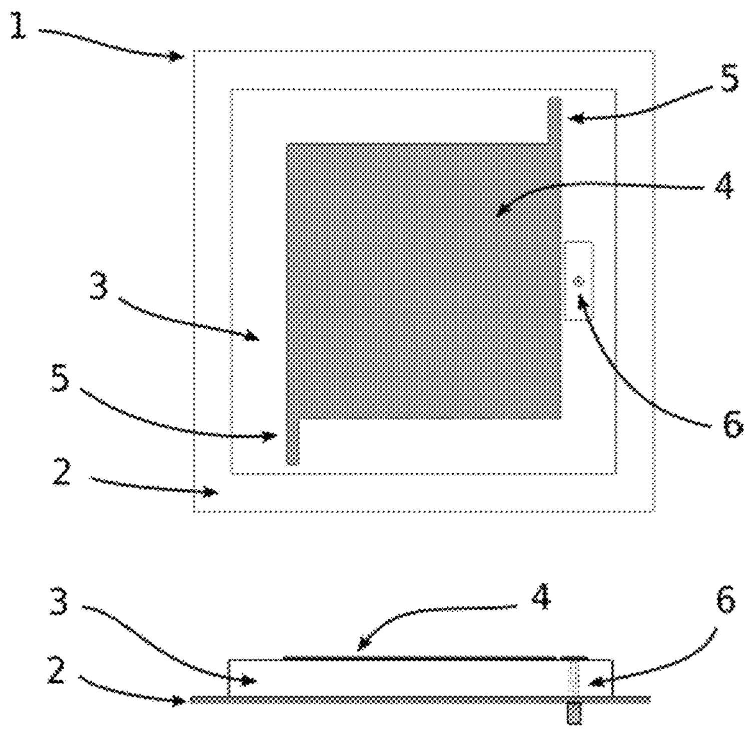
FIG. 2 illustrates the embodiment of the antenna element of FIG. 1 in a top view and a side view.

FIG. 2 provides a top view and a side view of the antenna element already shown in FIG. 1.

Figure 3:
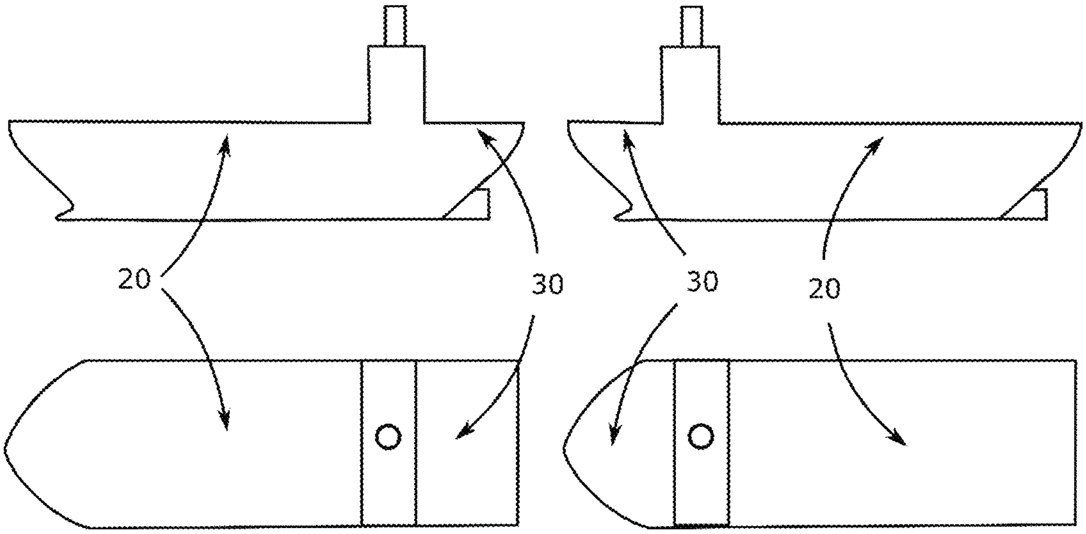
FIG. 3 illustrates a scheme of a cargo ship with an indication of the bridge, which divides the ship along the length axis in two parts.

The antenna array module is advantageously installed high on the ship, on or near the bridge from where the ship is commanded. Preferably the module is positioned on the monkey bridge, i.e. the highest navigational platform on the bridge, so that many line-of-sight paths are available to containers on or below deck. In most cases the bridge of a cargo ship is located closer to one end of the ship than to the other end, as illustrated in FIG. 3. In such case one can indicate a longer part (20) and a shorter part (30) of the ship when considered along its length axis. This terminology will be used throughout the rest of this description. Note that if the bridge were right in the middle, there would still be two parts (20,30), which then are of equal length. Conceptually this does not make any difference for the further description given below.

Figure 4:
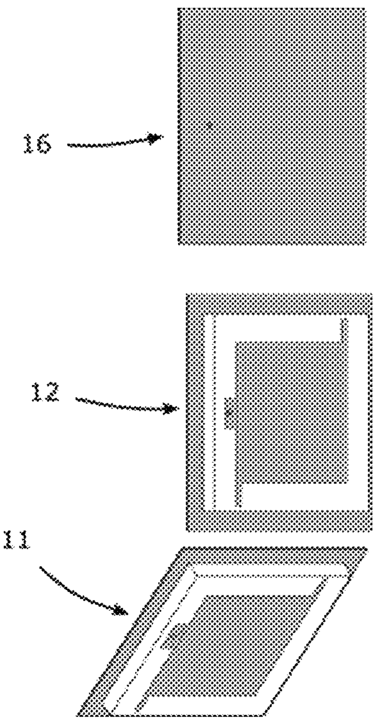
FIG. 4 illustrates an embodiment of the antenna array module with two antenna elements for radiating towards the longer part of the vessel and one antenna element for radiating towards the shorter part.
Figure 5A:
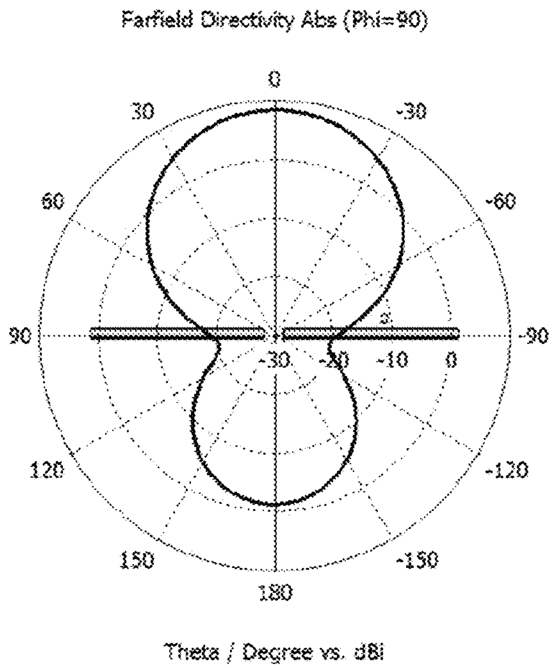
FIGS. 5*a* to 5*d*, illustrates some radiation patterns obtained with different tilting angles.
Figure 5B:
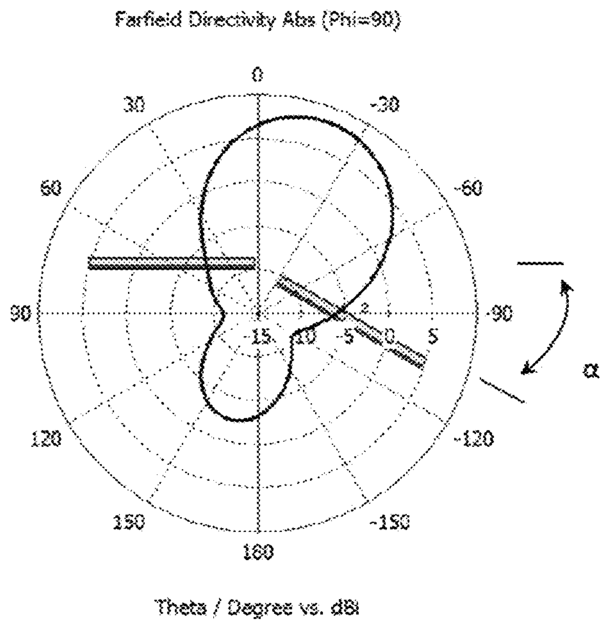
Figure 5C:
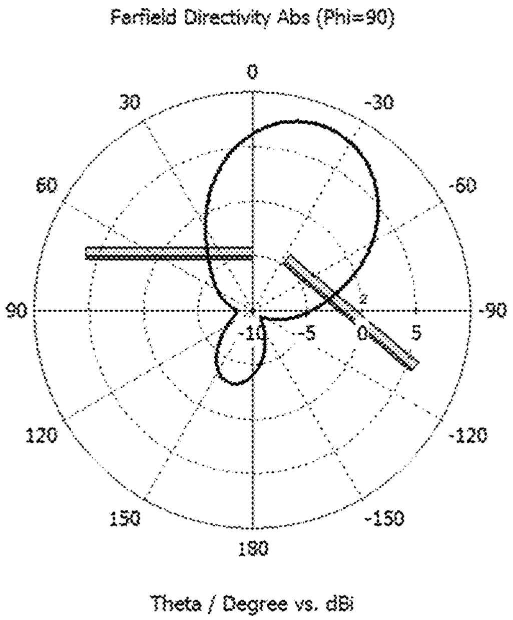
Figure 5D:
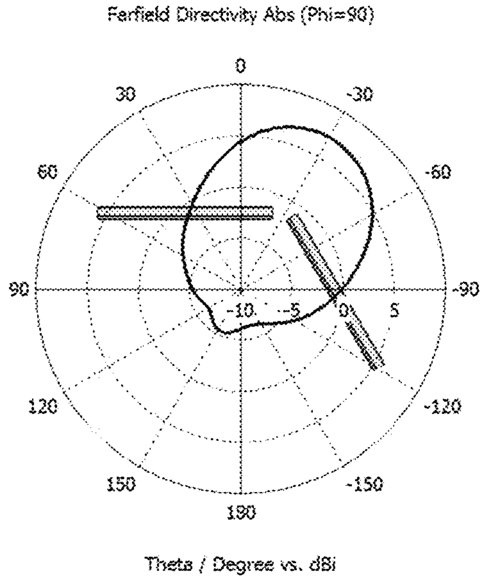

Improved directivity towards the longer part of the ship is obtained for the antenna array module by providing at least two antenna elements (11,12) tilted with respect to each other that mainly radiate towards a path covering said longer part of the ship over the entire width. FIG. 4 provides an illustration of such an antenna array module. In the embodiment of FIG. 4 the antenna element (11) is tilted from the vertical plane formed by the other two antenna elements. Radio coverage towards the shorter part of the ship is established by the antenna array module comprising at least a third antenna element (16) pointing to the opposite side of the side pointed at by the least two antenna elements that cover the longer part.

In preferred embodiments the antenna array module forms when installed a stack of antenna elements. Apart from the tilted antenna element the stack is substantially vertical. The various antenna elements may be interconnected by means of a power divider/combiner. The antenna elements may in some embodiments be implemented on a same printed circuit board (PCB) which then preferably also includes the power divider/combiner and the feeding lines.

In a preferred embodiment the antenna array module according to the present invention comprises two antenna elements (11,12) pointing at the same side of the ship, which work together as a single antenna to radiate mainly towards the longer part of the ship. Obviously, there may also be one or more smaller sidelobes that point substantially in an opposite direction, but those are not further considered here. One (11) of the two antenna elements is tilted with respect to the other over an angle α, whereby the angle is taken between the tilted antenna element (11) and the extension of the other antenna element (12). As the antenna elements different from the tilted antenna element preferably form a vertical stack, the angle α is the angle between the tilted antenna element and said vertical stack. The angle α is thereby less than 90°, preferably less than 80° or less than 70°, so that the two antenna elements produce a radiation pattern with a main lobe pointing to the same side when they emit radiation (or, in other words, when the two antenna elements are on the same side with respect to their ground plate). Due to this tilting a good signal level can be provided in containers located in the vertical direction with respect to the antenna position, including the containers positioned almost under the antenna, close to the vessel bridge.

The optimal inclination angle α of the first antenna element with respect to the second antenna element depends among other things on the dimensions of the vessel, in particular on the height of the piles of containers: the aim should be to allow communication both with containers at or near the top of the piles (usually, but not necessarily, above deck) as with containers located very deep in the cargo hold. The tilted antenna element makes with the other antenna element an angle which is preferably between 3° and 80°. In a more preferred embodiment the angle is in the range 5° to 70°. In most preferred embodiments the angle is 45°. The array of antenna elements is to be installed on or near the bridge so that they can provide line of sight propagation (i.e. the electromagnetic waves travel in a direct path from the transmitting source to the receiver) towards the longest part of the ship when seen from the bridge (see FIG. 3).

The optimal inclination angle is obviously also dependent on the number of antenna elements in the antenna array module. For example, when having an additional antenna element pointing towards the longest part of the vessel (as in embodiments further described below) the best angle α may be different from that in an embodiment with only two antenna elements.

Whereas an appropriate inclination angle is important for obtaining good coverage in a vertical plane, it is equally important to have good coverage in a horizontal plane. The antenna array module is therefore designed to provide a radiation pattern in a horizontal plane whereby the full width of the vessel is covered.

FIG. 5 shows directivity patterns to illustrate effect of the angle α for embodiment of FIG. 4. The tilting angle is α=0° in FIG. 5A, α=30° in FIG. 5B, α=40° in FIG. 5C and α=60° in FIG. 5D. When the tilting of the antenna element (11) with respect to the other (12) increases, the radiation pattern becomes less directive and the direction of maximum radiation moves down with respect to the horizontal direction. This makes it possible to also reach the containers in the deepest part of the cargo hold that are below the antenna.

Figure 6:
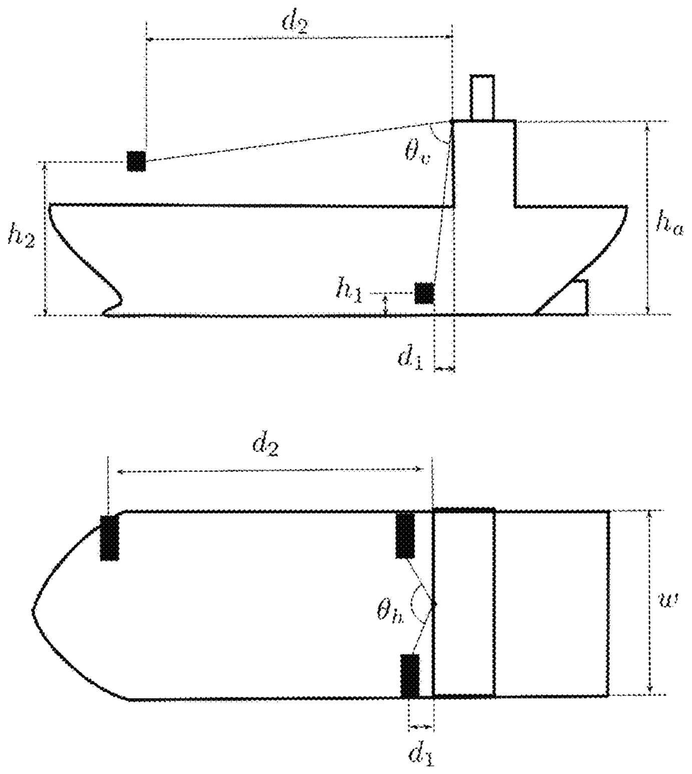
FIG. 6 illustrates the calculation of the antenna beam width both in a vertical and horizontal plane.

FIG. 6 illustrates an example of how the antenna beam width is calculated for the array of antenna elements. In the figure $h_a$ denotes the height (with respect to the bottom of the ship) of the antenna element of the antenna array module positioned on or near the bridge. The height of the nearest container (in the worst case) is $h_1$. The distance between the bridge and said nearest container is $d_1$. The height of the farthest container (in the worst case) is $h_2$ and the distance to it from the bridge is denoted $d_2$. The angle $\theta_v$ that needs to be covered by the antenna array module can then be calculated as $$\theta_v = \mathrm{arc}tg\left(\frac{d_2}{h_a - h_2}\right) - \mathrm{arc}tg\left(\frac{d_1}{h_a - h_1}\right)$$

Similarly, for the angle $\theta_h$ one can write the following expression:

$$\theta_h = \mathrm{arc}tg\left(\frac{w}{2d_2}\right)$$

By way of illustration the following values: $h_a$=62, $h_1$=3, $d_1$=5, $h_2$=40 and $d_2$=100 yield $$\theta_v = \theta_h = 72°$$

Figure 7:
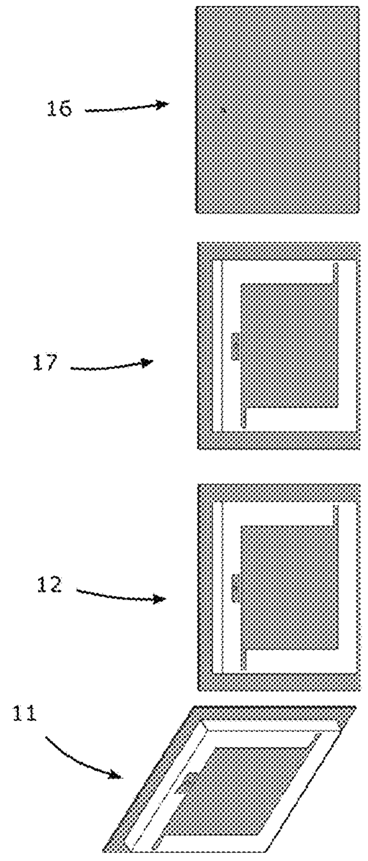
FIG. 7 illustrates an embodiment of the antenna array module according to the invention.
Figure 8A:
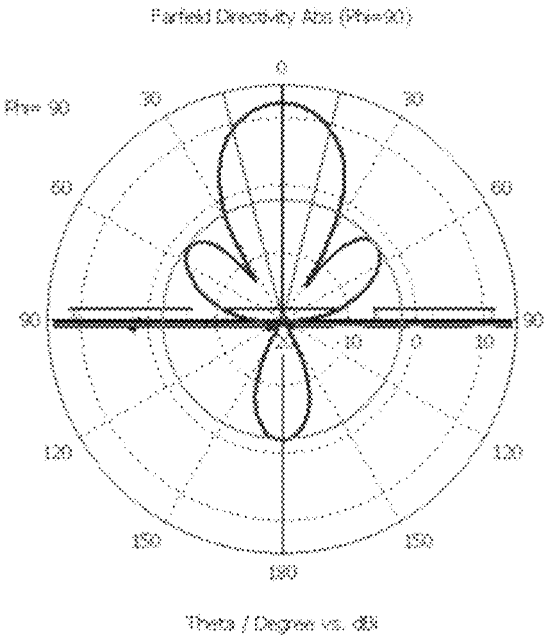
FIGS. 8*a* to 8*d*, illustrates the effect of changing the tilting angle α for the antenna array module of FIG. 7.
Figure 8B:
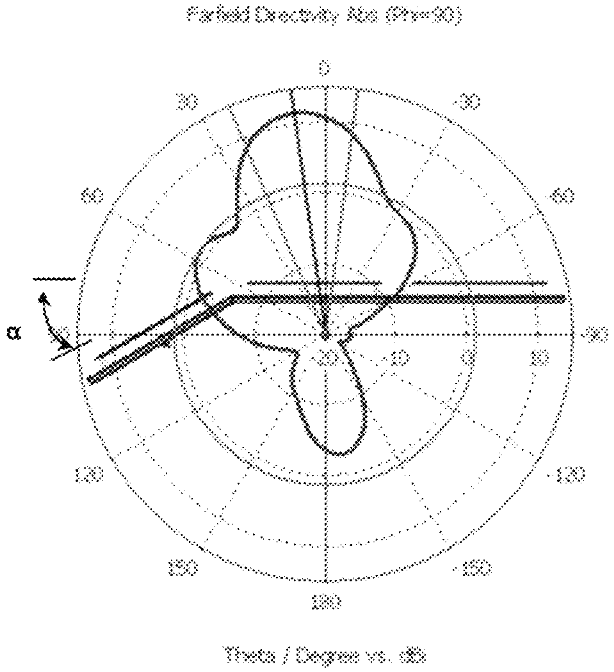
Figure 8C:
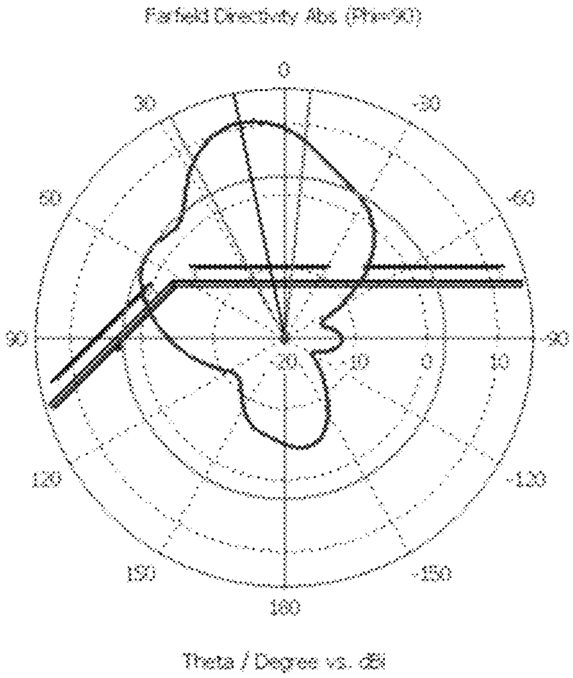
Figure 8D:
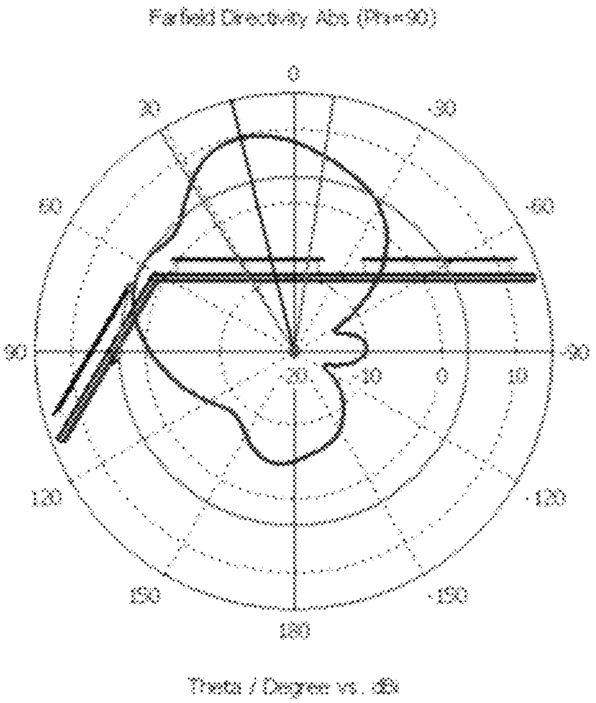

In advantageous embodiments of the antenna array module more than two antenna elements oriented towards the longer path are present in the module. Having more than two antenna elements with the same orientation further improves the directivity. As already mentioned, the optimal choice of the tilting angle α can be also affected by the fact of having more than two antenna elements. FIG. 7 illustrates a set-up with three antenna elements pointing at the longer path. FIG. 8 shows some directivity pattern for this set-up obtained with different tilting angles (α=0° in FIG. 8A, α=30° in FIG. 8B, α=45° in FIG. 8C and α=60° in FIG. 8D). When the tilting of the antenna element (11) with respect to the others (12,17) increases, the radiation pattern becomes less directive and the direction of maximum radiation moves down with respect to the horizontal direction. In other embodiments it may also be that the third antenna element (17) is also tilted with respect to antenna element (12). This depends on the specific case, in particular on the dimensions of the vessel. Having an extra tilted antenna element may be beneficial to achieve good coverage.

Turning back now to a minimum set-up with three antenna elements shown in FIG. 4, this embodiment of the antenna array module comprises, apart from the two antenna elements (11,12) that cover the longer part of the ship as discussed above, further also an antenna element (16) which is oriented towards the side opposite to the side the other two antenna elements, i.e. the tilted antenna element and its adjacent antenna element, point at. If the latter is referred to as the forward direction (corresponding to the longer part), then said antenna element to the opposite side can be said to point in the backward direction (corresponding to the shorter part). The third antenna element radiates mainly towards a second path opposite to the path to which the first and the second antenna element mainly radiate. This however should not necessarily be construed as if there were a difference of 180° between the first and the second path. Due to the tilting angle between the first and the second antenna element the difference is not 180°. However, the two paths always point at different sides of the vessel, meaning that their difference exceeds 90°. Each of the antenna elements (11,12,16) may be implemented as antenna element (1) in FIG. 1 in embodiments of the module.

Figure 9:
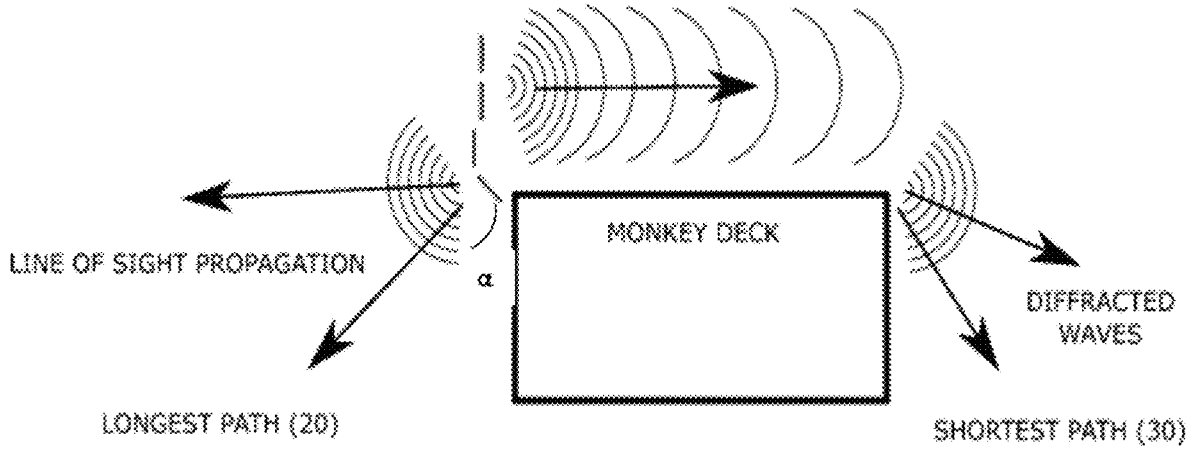
FIG. 9 illustrates the different radiation mechanisms for the two paths.

Embodiments of the antenna array module of the invention are advantageous in that the radio coverage of the shorter part (see FIG. 3) of the vessel is substantially improved. It is to be noted that in this backward direction the main radiation mechanism is not the same as for the other antenna elements. Whereas these other antenna elements exploit line of sight propagation, the antenna element oriented in the backward direction relies on diffraction of the signal on an horizontal edge. Due to the width of the monkey bridge where the antenna array module is typically installed on one of the railings, there is no line of sight with most of the positions of the containers where the communication needs to be established in the short side of the vessel. The radiated waves see the edge of the monkey bridge as a metal obstacle that will produce diffraction, so contributing in obtaining coverage in the shadow area (i.e. in the shorter path). From radio coverage field tests performed in vessels and analysis of the received signal power, it was concluded that one or more antenna element(s) located in a height above the railing where the antenna array is attached, allows getting good coverage on the shorter part of the vessel. In preferred embodiments the antenna element pointing in the backward direction is not tilted. In case there is more than one such antenna element they are vertically stacked in preferred embodiments. FIG. 9 illustrates the different type of propagation in the two paths.

In other embodiments the antenna array module may comprise four antenna elements, with two antenna elements in each direction. Two antenna elements are tilted with respect to each other. Preferably one of the antenna elements is positioned in a vertical plane. The other two antenna elements point in the backward direction. Again one or more antenna elements, preferably all, may in one embodiment be implemented as antenna element (1) in FIG. 1.

Figure 10:
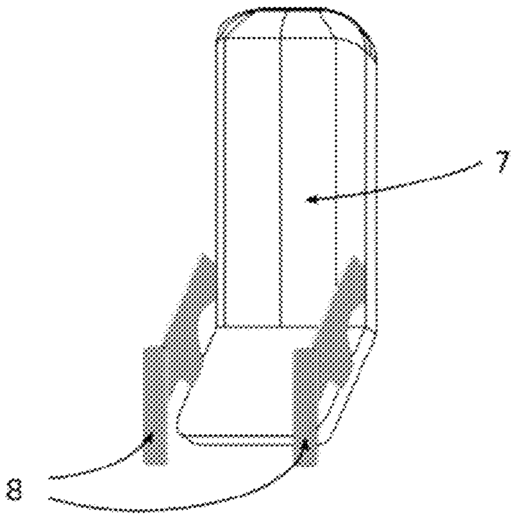
FIG. 10 illustrates an example of the radome used to protect the antenna (7) as well as the mechanical support (8) to fix the antenna onto the ship.

As the antenna array module is typically placed on the monkey bridge of the vessel, the antenna elements of the module is to be protected against the harsh conditions that may occur at the open sea. Therefore the antenna array module preferably comprises a housing or radome (7), as illustrated in FIG. 10. This figure further also shows the supports (8) with which the antenna array module is fixed to a railing of the monkey bridge.

The housing or radome (7) is designed to minimize the overall antenna array dimensions, as well as to reduce the wind load generated against the surface of the structure of the antenna array, especially under bad weather conditions such as strong winds, and especially when the vessel is at open sea. The internal structure or frame supports and distributes external effects like wind, vessel rolling, shocks, vibrations, etc., under which the complete structure gets mechanically stressed. This internal structure also hosts the different antenna elements, the power divider/combiner, cables to connect the antenna elements to the power divider/combiner, and the cable to connect the power divider/combiner to the external antenna interface. Depending on the embodiment of the antenna array module (e.g. an embodiment with two elements pointing to the forward direction, one tilted with respect to the other one, and a third element pointing to the backward direction, an embodiment with more elements pointing to the backward direction, . . . ), the internal structure may have differ slightly in shape and/or dimensions, while the housing (7) and supports (8) remain the same regardless of the number of antenna elements.

Goods stored in the cargo hold, like e.g. containers, can be equipped with a transponder or a tag that allows bidirectional communication with the communication unit positioned e.g. on the monkey bridge, via the antenna array module of this invention. The goods, e.g. containers, are further provided with one or more sensing means to keep track of one or more parameters indicative of the environmental conditions inside the container or outside, in its neighbourhood. Further transponders provided with sensors can be provided in the ship so that also in absence of cargo communication is possible, for example related to the conditions in the cargo hold. Commands can be exchanged between a transponder of a container (or another stored good) or located in the ship itself and the communication unit to request and convey for example one or more of the following data:

identification of the container
temperature in the container or outside the container
air humidity
ionizing radiation
chemical composition of the ambient air
electromagnetic field sensed on the container
an impact, shock or vibration the container has undergone
exchange of information (e.g. performance indicators) needed to allow remote processing on the transponder (e.g. switching on/off, upgrading firmware by sending command(s) to the transponder and the transponder downloading the required files to perform the upgrade, . . . )

The transponder may basically have the same or similar building blocks as for instance in US2004/246104. The transponder comprises a module arranged for receiving commands from the communication unit, e.g. requests to send its identification data or data on one or more parameters. The antenna in the transponder module is adapted to cooperate with the antenna array module as set out above. More in particular, the antenna in the transponder module meets constraints for example in terms of size, battery and weight. Given that containers are metallic, also in terms of location of the antenna there are constraints. Small printed antennas are the most preferred for the considered application.

The transponder is further also arranged to transmit the requested information back to the communication unit. This can be organized in several ways. In one embodiment the communication from the transponder to the communication unit can use the same frequency as in the opposite direction, in a semi-duplex fashion. In another embodiment a dedicated frequency in the same frequency range is used for communication going to the communication unit, which is different from the frequency used in the direction towards the transponder.

In order to save energy the communication system may advantageously have a low power mode wherein the transponders of the containers remain in a sleep mode until a wake up signal is received. The wake-up signal can be for a specific transponder or for a set of transponders or for all transponders. The way the transponder is woken up, may depend on the protocols applied in the layers above the physical layer. The transponder behaviour is typically programmable, for example waking up every X minutes/hours/days, performing a certain set of actions, reporting this outcome of one or more of these actions, and then going back to sleep.

The antenna array module of the invention is preferably arranged to operate at a specific frequency of e.g. 433 MHz, or 868 MHz or 915 MHz. In certain embodiments a plurality of antenna module arrays, each operating at a different frequency, are placed next to one another. For example, three antenna modules as previously described can be provided, one to operate at 433 MHz, one at 868 MHz and one at 915 MHz. In some embodiments only one of the three can be operable at a given moment in time. The frequency used can be automatically selected by the communication unit, or manually triggered by a remote operator.

In some embodiments the antenna array module can be arranged to switch between two or more frequencies.

The communication unit is in preferred embodiments of the communication system comprising the antenna array module, implemented as a part of a gateway, i.e. a networking hardware device that allows communication and interaction between e.g. a host network and a remote network. The gateway serves as an entry and exit point of a network. The gateway provides the bridge between the distinct network parts, i.e. devices on the ship, the cloud, infrastructure on land.

When a portion of information from the transponders of one or more containers is received via the antenna array module in the communication unit (e.g. gateway), the communication unit can operate in a predefined way. The communication unit (e.g. the gateway or on-board central equipment) the antenna array module(s) is/are connected to, comprises an awareness mechanism to know which networks are available to relay the information coming from the sensors or containers on-board, to the infrastructure on-land (or the other way around: to collect remote commands, to relay them to the related sensors or containers on-board). The networks and also network attachment schemes used depend on the particular implementation of this type of gateways. In one example it may be that the gateway/central equipment is adapted for landside cellular and satellite communications, and depending on the design (related or not to network availability, traffic/service costs associated, etc.) the communications unit may choose to firstly check cellular communications and only if there is no landside cellular network available, check the satellite network. In another case it may be just the other way around. The antennas create a sort of WiFi local network on-board, i.e. some kind of “internal” or “local” network interface, while landside cellular, satellite, or other is on the “external” network interface side.

In another aspect the invention relates to a method for installing an antenna array module on a cargo ship. The method comprises providing an antenna array module as previously presented. Next, the antenna array module is mounted on a railing of a platform on the bridge of the cargo ship. In order to maximally exploit the effect of the tilting angle and line of sight propagation towards the longer side of the vessel, the antenna array module is most preferably installed on the railing located in the side of the installation deck (typically monkey bridge) which is pointing to the longer side of the vessel. As already mentioned previously, the bridge of the cargo ship is typically so positioned that it divides the ship along its length axis in a longer part and a shorter part. The first (11) antenna element is tilted with respect to the second (12) antenna element. These antenna elements are so positioned that the main lobe of their directive pattern points towards a first path corresponding to the longer part. The third (16) antenna element is positioned to radiate mainly towards a second path opposite to the first path.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word “comprising” does not exclude other elements or steps, and the indefinite article “a” or “an” does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for installing an antenna array module on a cargo ship, the method comprising:

taking an antenna array module for a communication system on said cargo ship, said antenna array module comprising at least a first, a second and a third antenna element, each containing an antenna feed, mounting said antenna array module on the bridge of said cargo ship, said bridge being so positioned to divide said cargo ship along its length axis in a longer part and a shorter part, wherein said first antenna element is tilted with respect to said second antenna element and said first and said second antenna element are so positioned that the main lobe of their directive pattern points towards a first path corresponding to said longer part and said third antenna element is positioned to radiate mainly towards a second path opposite to said first path.

2. The method for installing as in claim 1, wherein at least one of said antenna elements is a patch antenna.

3. The method for installing as in claim 1, wherein said first and said second antenna element are tilted with respect to one another over an angle in the range of 5° to 70°.

4. The method for installing as in claim 1, wherein at least one of said antenna elements is arranged for radiating with circular polarization.

5. The method for installing as in claim 4, wherein said at least one antenna element is provided with perturbations to excite two orthogonal radiation modes.

6. The method for installing as in claim 1, wherein said antenna elements are arranged on a substrate of dielectric material.

7. The method for installing as in claim 1, wherein said antenna array module comprises a power divider/combiner arranged to split a signal to be transmitted over said at least three antenna elements and to combine signals received from the at least three antenna elements.

8. The method for installing as in claim 1, wherein said first antenna element, when installed, is tilted with respect to a vertical plane wherein said second antenna element is positioned to improve directivity in vertical direction.

9. The method for installing as in claim 1, wherein said at least three antenna elements form a substantially vertical stack.

10. The method for installing as in claim 1, wherein said antenna elements are made in a printed technology.

11. The method for installing as in claim 1, wherein said antenna array module comprises a housing for said antenna elements.

12. The method for installing as in claim 1, wherein said third antenna element is not tilted with respect to said second antenna element.

13. The method for installing as in claim 1, wherein a plurality of said antenna array modules are mounted on said bridge.

14. The method for installing as in claim 1, wherein said antenna array module is mounted on a side of said bridge where a direct line of sight towards said longer part is available.

* * * * *